US007627174B1

(12) United States Patent
Adams et al.

(10) Patent No.: US 7,627,174 B1
(45) Date of Patent: Dec. 1, 2009

(54) DIGITAL IMAGE CROP AND ORDER LINKED TO A PHYSICAL CROPPING TOOL

(75) Inventors: Cheryl Adams, Cary, NC (US); Patricia Scardino, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 666 days.

(21) Appl. No.: 11/239,036

(22) Filed: Sep. 29, 2005

Related U.S. Application Data (63) Continuation-in-part of application No. 11/210,334, filed on Aug. 24, 2005.

(51) Int. Cl.
*G06K 9/34* (2006.01)

(52) U.S. Cl. .................................... 382/173

(58) Field of Classification Search ................ 382/100, 382/276–308; 345/619–689; 434/129; 358/1.18, 358/500, 1.9, 2.1, 537, 468, 1.2, 1.6; 706/927
See application file for complete search history.

(56) References Cited

U.S. PATENT DOCUMENTS

| | | | |
|---|---|---|---|
| 6,587,596 B1 | 7/2003 | Haeberli | |
| 7,142,225 B1 * | 11/2006 | Boler et al. | 345/619 |
| 2001/0046330 A1 * | 11/2001 | Shaffer et al. | 382/284 |
| 2003/0058254 A1 * | 3/2003 | Dworsky et al. | 345/619 |
| 2003/0058354 A1 | 3/2003 | Parulski et al. | 348/231.6 |
| 2004/0091256 A1 | 5/2004 | Brost | 396/380 |
| 2004/0091257 A1 | 5/2004 | Brost | 396/380 |
| 2004/0212695 A1 | 10/2004 | Stavely et al. | 348/231.3 |
| 2004/0257380 A1 | 12/2004 | Herbert et al. | 345/619 |
| 2005/0271864 A1 * | 12/2005 | van Driesten et al. | 428/195.1 |
| 2006/0177132 A1 | 8/2006 | Jackson et al. | |

* cited by examiner

*Primary Examiner*—Samir A. Ahmed
*Assistant Examiner*—Atiba O Fitzpatrick
(74) *Attorney, Agent, or Firm*—Withrow & Terranova, PLLC

(57) ABSTRACT

A system and method are provided for cropping images for scrapbook pages. In general, a desired area of a digital image is identified in a software environment. The desired area has a shape corresponding to a select cropping tool for physically cropping the digital image. Cropping information defining the desired area is generated and stored in association with the digital image. Using the cropping information, a crop-assisted version of the digital image identifying the desired area of the digital image and the select cropping tool is generated and printed. As such, the crop-assisted version of the digital image may be easily cropped using the select cropping tool when physically creating a scrapbook page.

22 Claims, 7 Drawing Sheets

DIGITAL IMAGE CROP AND ORDER LINKED TO A PHYSICAL CROPPING TOOL

RELATED APPLICATIONS

This application is a Continuation-in-Part of U.S. patent application Ser. No. 11/210,334, entitled METHODS FOR STORING MULTIPLE IMAGE MODIFICATIONS, filed Aug. 24, 2005, currently pending, which is hereby incorporated herein by reference in its entirety.

FIELD OF THE INVENTION

The present invention relates to cropping digital images and more particularly relates to generating and storing information defining a desired area of a digital image to be placed in a scrapbook.

BACKGROUND OF THE INVENTION

Scrapbooking is a popular hobby among photo enthusiasts where one creates a photo album, or scrapbook, using his or her photographs. Typically, a group of people get together for a scrapbooking "party" organized by a consultant associated with a scrapbooking company, such as Creative Memories. The consultant provides tools, such as cropping tools, for the group to use and various supplies that may be purchased. Using the provided tools and optionally purchased supplies, each person in the group designs his or her own scrapbook. One disadvantage with this type of physical scrapbooking is that the individuals typically cannot begin designing their scrapbook pages until they are at the scrapbooking party where the supplies are located. Thus, it is typically difficult for the individuals to know which photographs, tools, and supplies they will need and for the consultant to ensure that all of the necessary tools and supplies will be available.

One alternative to physically creating a scrapbook is to purchase digital scrapbooking software that allows a user to create scrapbook pages or an entire scrapbook and to print the scrapbook pages. However, the printed scrapbook pages are two-dimensional and lack personal touches such as handwritten journaling, wherein a handwritten message is written on the scrapbook page; three-dimensional elements; and memorabilia such as tickets from a show a couple saw on the day they became engaged, a label from a champagne bottle from a couple's wedding toast, or a child's kindergarten graduation diploma.

Thus, there remains a need for a method of scrapbooking that provides the ease of design and planning associated with scrapbooking software while maintaining the ability to include three-dimensional elements and personal touches associated with physical scrapbooking.

SUMMARY OF THE INVENTION

The present invention provides a system and method for cropping images for scrapbook pages. In general, a desired area of a digital image is identified in a software environment. The desired area has a shape corresponding to a select cropping tool for physically cropping the digital image. Cropping information defining the desired area is generated and stored in association with the digital image. Using the cropping information, a crop-assisted version of the digital image identifying the desired area of the digital image and the select cropping tool is generated and printed. As such, the crop-assisted version of the digital image may easily be physically cropped after printing using the select cropping tool when creating a physical scrapbook page.

In one embodiment, a scrapbook page is digitally designed by selecting a layout from a set of layouts. For each digital image desired to be included in the scrapbook page, a desired area of the digital image having a crop shape corresponding to a select cropping tool is identified, and cropping information defining the desired area is generated and stored in association with the digital image. Thereafter, crop-assisted versions of the digital images included in the scrapbook page are generated and printed. A list of supplies including the select cropping tools needed to create the scrapbook page may be generated, where the list may optionally be provided to a consultant of a scrapbook company who is hosting an upcoming scrapbooking party. A copy of the final layout of the scrapbook page may also be printed to assist in creating the scrapbook page.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
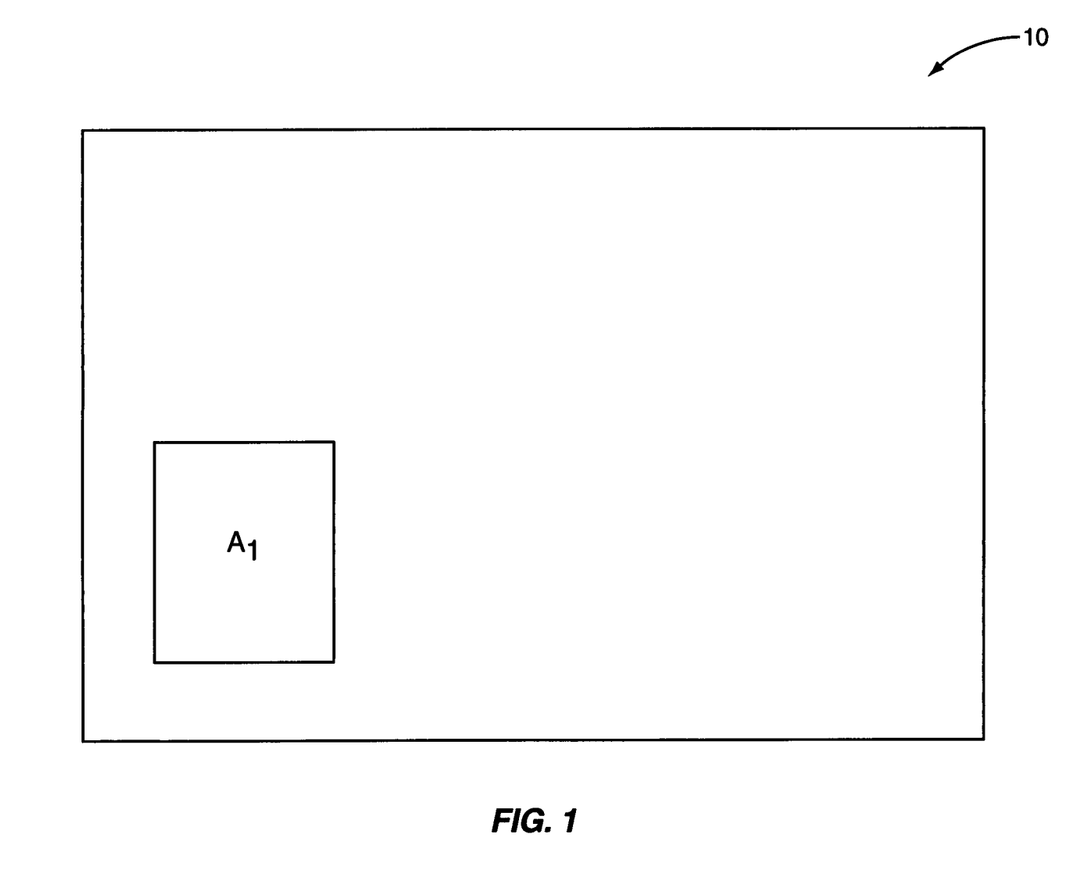
FIG. 1 illustrates an exemplary digital image including a first desired area corresponding to a first crop wherein cropping information defining the first desired area is stored according to the present invention.

The present invention provides a system and method for performing multiple crops on a single digital image without altering the image, wherein at least one of the crops may be associated with a scrapbooking feature. Referring to FIG. 1, a user may identify a desired area ($A_1$) of a digital image 10. Rather than actually cropping the digital image 10 to produce a new digital image, cropping information defining the desired area ($A_1$) is generated and stored either in metadata associated with the digital image 10 or in an application file. The application file is a file that is generated and maintained by a software program, as will be apparent to one of ordinary skill in the art.

Metadata is used herein to refer to information within a digital image file that describes or otherwise relates to the digital image. Digital image formats such as Joint Photographic Experts Group (JPEG), Tagged Image File Format (TIFF), Graphical Interchange File Format (GIFF), Window Bitmap Graphics Format (BMP), and the like include metadata. For example, the JPEG format is based on tags or headers. The JPEG file is read as a stream of data. The data is parsed to identify desired tags. There are tags that define the start and end of the file, the beginning and end of the compressed image, the beginning and end of the compression table, and the beginning and end of various types of metadata. At least one of the tags is defined by the standard and used to define user specified metadata. The tag for the user specified metadata may be used to identify the location where the cropping information is stored within the file. However, the user specified metadata may include information other than the cropping information. Thus, there may be secondary tags within the user specified metadata indicating the beginning and end of the cropping information. If the digital image is opened by a software program that does not recognize the stored cropping information, the tag is simply ignored. Similar methods could be used for other file formats that support user specified data.

For formats that do not support user specified data, an application file that is generated and maintained by a software program that generates the cropping information may be used to store cropping information for numerous crops of one or more digital images. The application file may also include various types of information that is used by the software during operation.

Figure 2:
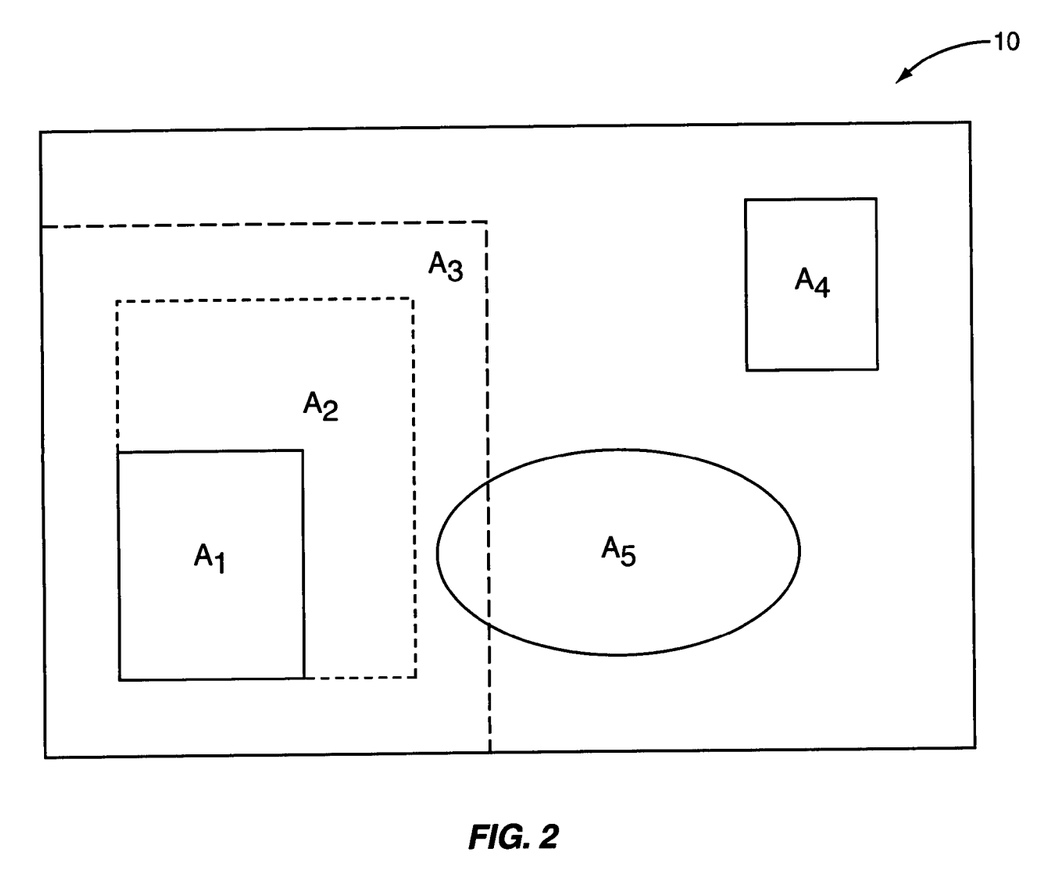
FIG. 2 illustrates the exemplary digital image of FIG. 1 including multiple desired areas corresponding to multiple crops wherein cropping information defining each of the desired areas is stored according to the present invention.

As illustrated in FIG. 2, a user may perform numerous crops on the digital image 10 by identifying any number of desired areas ($A_X$). As illustrated, there are five areas ($A_1$-$A_5$). Rather than actually cropping the digital image 10 to create new digital images for each of the desired areas ($A_1$-$A_5$), the desired areas ($A_1$-$A_5$) are identified, and the cropping information defining the desired areas ($A_1$-$A_5$) is generated and stored either in the metadata associated with the digital image 10 or in an application file associated with the photoediting software. Although FIG. 2 illustrates five desired areas ($A_1$-$A_5$), the present invention is not limited thereto. Cropping information may be generated and stored for any number of desired areas ($A_X$). As illustrated, the desired areas ($A_1$-$A_5$) may or may not overlap one another.

Each of the desired areas ($A_1$-$A_5$) may have any desired shape and size. For example, the shapes of the desired areas ($A_1$-$A_5$) may be standard crop shapes having length to width ratios corresponding to the length to width ratios of standard pictures sizes such as, but not limited to, 8×10, 5×7, and 4×6. As another example, the desired areas ($A_1$-$A_5$) may each have a length to width ratio of an 8×10 standard picture size, but have different sizes, cover different areas of the digital image 10, and have unique photoedits applied thereto. The sizes of the desired areas ($A_1$-$A_5$) may be defined in terms of pixels per inch, dots per inch (DPI), where "dots" refers to pixels, a digital zoom level, or a relative size with respect to the original digital image. The sizes of the desired areas ($A_1$-$A_5$) affect the file size of corresponding temporary cropped images generated based on the cropping information. As discussed below, the temporary cropped images may be sent to an intended recipient such as a printer, an email recipient, or a company responsible for producing a desired product.

Once the cropping information defining the desired areas ($A_1$-$A_5$) is stored, the user may wish to perform an operation such as print the digital image 10, email the digital image 10, order a product with the digital image 10 printed thereon, fax the digital image 10, send the digital image 10 to a digital picture frame, or send the digital image 10 to a mobile phone. For this example, the user desires to print or order one or more 8×10 photographs of the desired area ($A_1$) of the digital image 10. When the user prints or orders the prints of the desired area ($A_1$), a temporary cropped digital image may be generated based on the stored cropping information for the desired area ($A_1$) and provided to either the user's printer or a photo printing service provider. In a similar fashion, if the user desired to perform any other desired operation such as emailing the digital image 10, ordering a product with the digital image 10 printed thereon, faxing the digital image 10, sending the digital image 10 to a digital picture frame, or sending the digital image 10 to a mobile phone, a temporary image would be generated based on the cropping information for the desired area and used to perform the operation.

The shapes of the desired areas ($A_1$-$A_5$) may also be one of a number of predetermined crop shapes associated with a product such as a mug, mouse pad, poster, calendar, t-shirt, and the like, which may be ordered with a desired portion of the digital image 10 printed thereon. For example, the desired area ($A_4$) may have a predetermined crop shape for a product such as a mug. When the user desires to order the product, the cropping information for the desired area ($A_4$) may be retrieved to generate a temporary cropped digital image for the product. The temporary cropped digital image generated based on the cropping information may then be provided, or transmitted, to a service provider that produces the product having the desired area ($A_4$) of the digital image 10 printed thereon.

The shapes may also be any shape such as, but not limited to, a rectangle, square, circle, ellipse, star, diamond, and the like. This may be particularly beneficial in a software environment that provides a scrapbooking feature. For example, the software may allow the user to create an electronic scrapbook having pictures, captions, graphics, and the like. The electronic scrapbook may be ordered from a service provider or printed by the user. A desired area may be identified and corresponding cropping information stored for each digital image used in the scrapbook. The desired areas of the digital images may be any desired shape and size. For example, the desired area ($A_5$) is an ellipse and may be used in the scrapbook. When the scrapbook is viewed, the software may retrieve the cropping information defining the desired area ($A_5$) from either metadata associated with the digital image 10 or from an application file associated with the software, and may automatically display the desired area ($A_5$) of the digital image 10. When the scrapbook is ordered or printed, the digital image 10 may be cropped based on the stored cropping information for the desired area ($A_5$) to provide a temporary cropped digital image that is provided to an intended recipient such as the user's printer or a service provider.

For each of the desired areas ($A_1$-$A_5$), cropping information is stored and may include an area definition defining the desired area. As will be apparent to one of ordinary skill in the art, the area definition may take many forms and may vary depending on the particular implementation. However, as an example, the area definition may define the border of the desired area. Alternatively, a shape, size, and reference point may be used to define the desired area. For a rectangular shape, the area definition may include a reference point such as a center point or a corner point, a length, and a width. For a circular shape, the area definition may include a center point and a radius.

The cropping information for each desired area may optionally include additional information defining photoedits that are to be applied only to the desired area. For example, for the desired area ($A_1$), the cropping information may include an area definition defining the desired area ($A_1$) and may optionally include information defining edits made only to the desired area ($A_1$). These additional edits may include adjustments to gamma brightness, sharpness, or contrast, or the like, as well as provide special effects. Rather than actually altering the image, information defining the desired photoedits may be stored in the metadata or in an associated application file.

Figure 3:
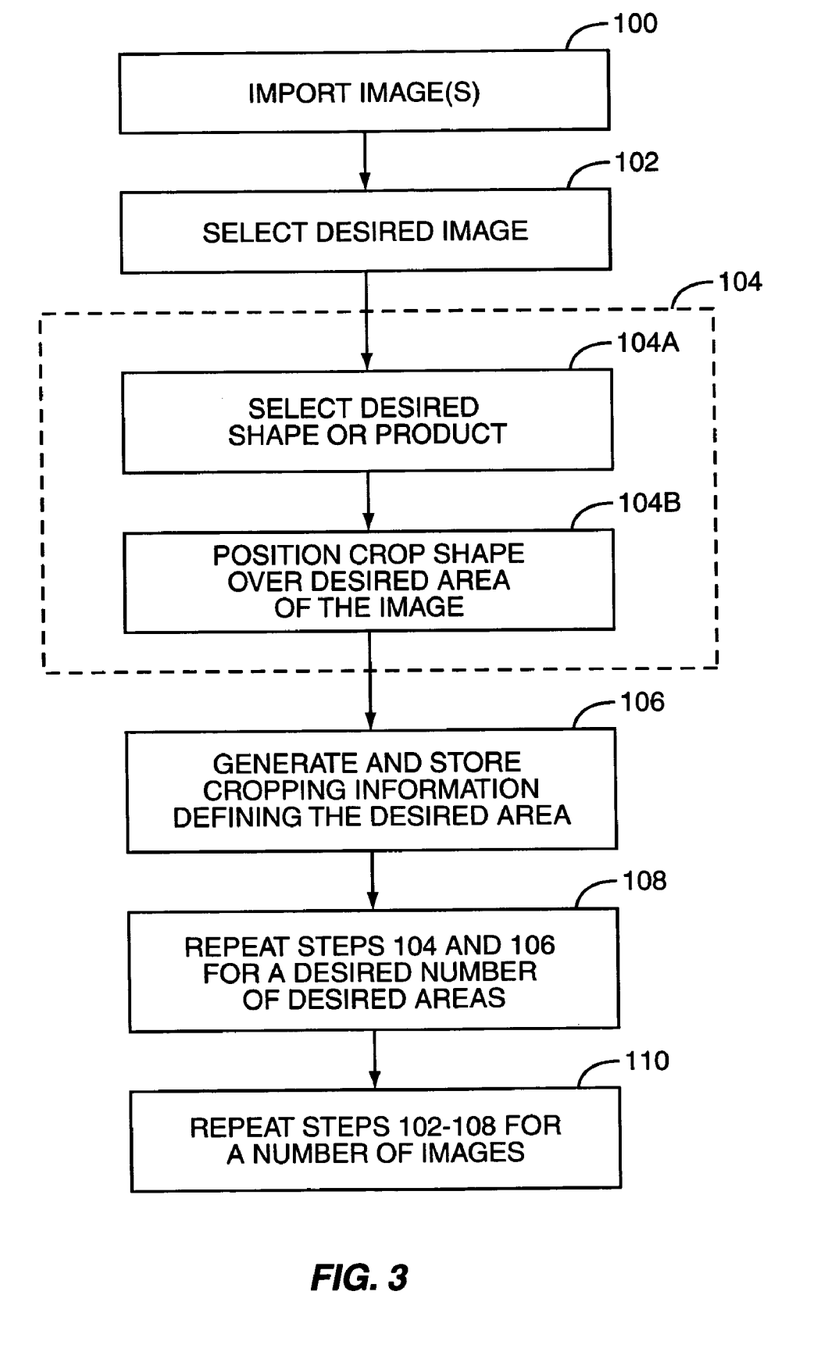
FIG. 3 illustrates an exemplary method for performing multiple crops on a digital image according to one embodiment of the present invention.

FIG. 3 illustrates an exemplary method for performing multiple crops on a single digital image according to one embodiment of the present invention. First, one or more digital images may be imported into a software environment (step 100). Then, a desired digital image may be selected (step 102). Steps 100 and 102 may alternatively be performed by simply opening a desired digital image file. Once the digital image is selected, a desired area of the digital image is identified (step 104), and cropping information defining the desired area is generated and stored (step 106).

As an example, the desired area of the digital image may be identified by selecting a desired crop shape or product on which the image will be placed (step 104A). The user may select an 8×10 ratio crop, a 5×7 ratio crop, a 4×6 ratio crop, a circular crop, a rectangular crop, or the like. If a desired product is selected, the crop shape may be predetermined. After selecting the desired crop shape or product, the user may then position the crop shape over the desired area of the digital image (step 104B). Positioning the crop may include resizing the crop shape. If the digital image is a photograph of a group of people, the user may place the crop shape over a desired person in the group of people and resize the crop shape to select only the face of the desired person. Note, however, that resizing the crop shape does not change the shape of the crop. If the crop shape is a rectangle having a length to width ratio of a standard 8×10 picture, resizing the crop shape changes the desired area inside the crop but does not change the length to width ratio. Positioning the crop may also include rotating the crop shape. If the crop shape is a rectangle having a length to width ratio of a standard 8×10 picture, the crop shape may be rotated to have either an 8×10 length to width ratio or a 10×8 length to width ratio. It should also be noted that steps 104A and 104B may alternatively be performed by allowing the user to create a free-form crop shape. The free-form crop shape is any shape that is uniquely created by the user. The user may create the crop shape over the desired area of the digital image. Alternatively, the user may create the free-form shape and then be allowed to resize the shape, reposition the shape, and the like.

Once the desired area is identified (step 104), cropping information defining the desired area of the digital image is stored (step 106). A name or other identifier for the desired area may be generated automatically by the software or entered by the user. For example, the software may automatically generate "8×10" as the identifier for the cropping information. Alternatively, the user may enter the identifier "Tom's Face—8×10". The identifier may be used by the user or by the software in order to locate cropping information for a desired crop. Steps 104 and 106 may optionally be repeated to identify any number of desired areas of the digital image and to generate and store corresponding cropping information (step 108). Thereafter, steps 102-108 may optionally be repeated for any number of digital images (step 110).

The present invention of storing cropping information defining a desired area of a digital image has many practical applications, one of which is scrapbooking. As discussed above, the present invention may be used to provide cropped digital images for digital scrapbooks which may be printed or ordered from a service provider. However, by printing the scrapbook, many personal touches such as handwritten text, memorabilia, and three dimensional elements associated with traditional scrapbooks are not included.

Thus, as described below, the present invention also provides a method for generating crop-assisted digital images having desired areas identified using crop shapes corresponding to cropping tools that will be used to physically crop the digital images. Using the crop-assisted images, the images may be easily cropped using the cropping tools when creating the scrapbook page. The present invention also provides a method for designing and ordering scrapbook pages that provides the ease of design associated with scrapbooking software while maintaining the personal touches associated with traditional scrapbooking.

Figure 4:
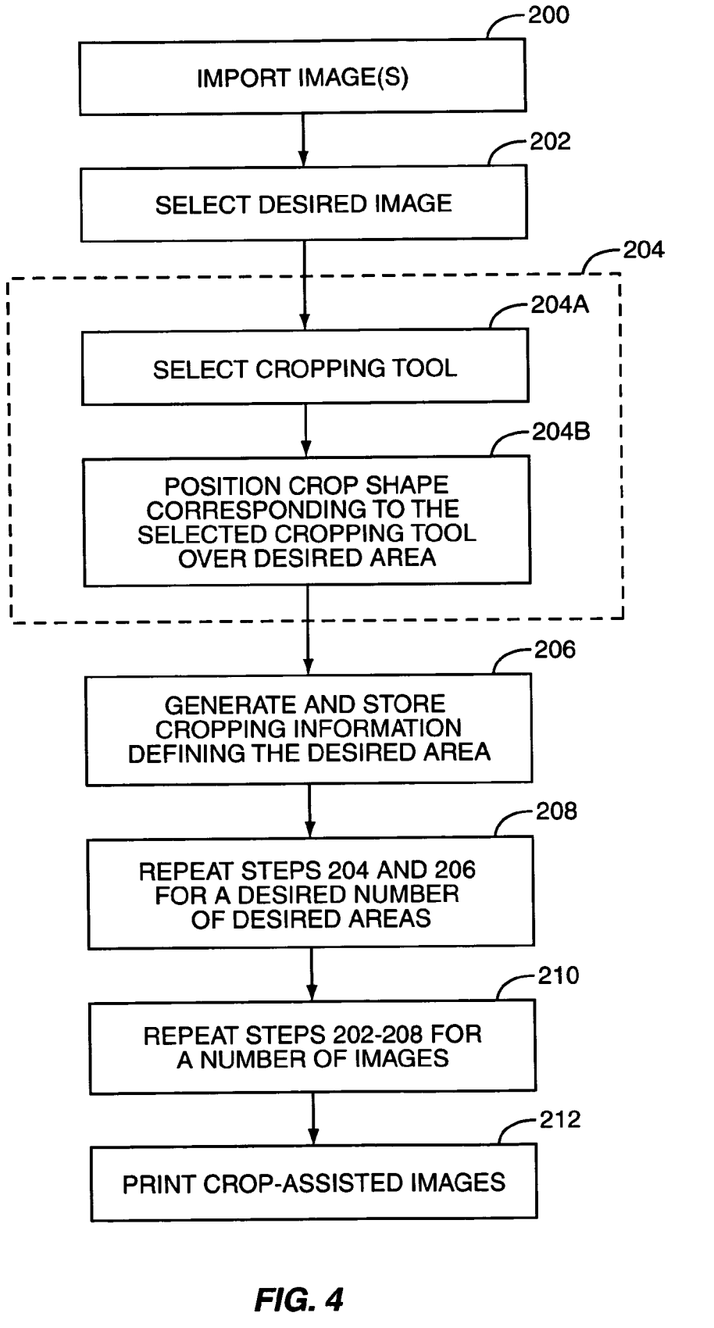
FIG. 4 illustrates an exemplary method for generating crop-assisted images for one or more scrapbook pages according to one embodiment of the present invention.

FIG. 4 illustrates an exemplary process for generating and printing crop-assisted images for one or more scrapbook pages. In general, one or more digital images may first be imported into a software environment (step 200). Then, a desired digital image may be selected (step 202). Steps 200 and 202 may alternatively be performed by simply opening a desired digital image file. Once the digital image is selected, a desired area of the digital image is identified (step 204), and cropping information defining the desired area is generated and stored (step 206).

As an example, the desired area of the digital image may be identified by selecting a cropping tool from a set of cropping tools to be used to crop the digital image when physically creating a scrapbook page (step 204A). For example, if the scrapbook page will be created using a scrapbooking company's cropping tools and supplies, then the user may select a particular cropping tool, blade, and blade position (inside or outside), as is commonly known to one having used a scrapbooking company's cropping tools. It should be noted that a user of the software environment, or owner of the digital image, may be required to purchase a software package plug-in for a particular cropping tool set and set of available supplies. For example, the user may be required to purchase a scrapbooking company's software package plug-in that defines the cropping tool set and optionally the available supplies that may be purchased.

After selecting the desired cropping tool, the user may then position a crop shape corresponding to the selected cropping tool over a desired area of the digital image (step 204B). Positioning the crop shape may include moving the crop shape or resizing the digital image such that the desired area of the digital image is within the crop shape. For example, if the digital image is a photograph of a group of people, the user may place the crop shape over a desired person in the group of people and either resize the digital image or reposition the crop shape to select only the face of the desired person. Note that resizing the digital image or moving the crop shape does not change the shape of the crop shape. If the crop shape corresponds to an elliptical cropping tool whose major axis is four inches and minor axis is three inches, resizing the digital image or repositioning the crop shape changes the desired area inside the crop shape but does not change the lengths of the major and minor axes of the crop shape when the desired area is printed. Positioning the crop may also include rotating the crop shape. If the user desires a different crop size, the user may need to select a different crop tool having the desired size.

Once the desired area is identified (step 204), cropping information defining the desired area of the digital image is generated and stored (step 206). A name or other identifier for the desired area may be generated automatically by the software or entered by the user. The identifier may be used by the user or by the software in order to locate cropping information for a desired crop. Steps 204 and 206 may optionally be repeated to identify any number of desired areas of the digital image and to generate and store corresponding cropping information (step 208). Thereafter, steps 202-208 may optionally be repeated for any number of digital images (step 210). Prior to going to a scrapbooking party, crop-assisted images may be printed using the stored cropping information (step 212). More specifically, for each of the desired areas identified in step 204, a crop-assisted image may be printed either at a local printer or by a photo printing service provider. In either case, a temporary digital image corresponding to the crop-assisted image may be generated based on the cropping information. The temporary digital image may then be provided to the local printer or the photo printing service provider to provide a printed copy of the crop-assisted image.

In one embodiment, the crop-assisted image includes a dashed line or the like identifying the desired area of the digital image and identifies the cropping tool needed to physically crop the digital image. In another embodiment, the crop-assisted image includes only the desired area of the digital image, rather than the entire digital image, and identifies the cropping tool needed to physically crop the digital image. The crop-assisted images may then be taken to a scrapbooking party where a consultant for a scrapbooking company makes the cropping tools and other supplies available for purchase. Alternatively, if the crop-assisted image is printed by a photo printing service provider, the printed crop-assisted image may optionally be sent to the consultant of the scrapbooking company who is hosting the upcoming scrapbooking party. Since the crop-assisted images already identify the desired area and the cropping tool needed, the crop-assisted images may easily be cropped using the cropping tools identified on the crop-assisted images to provide cropped images to be placed into a scrapbook.

Figure 5A:
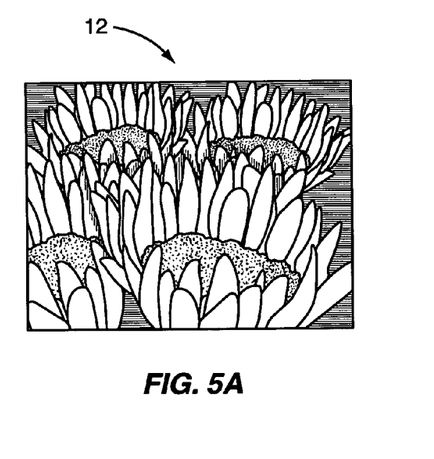
FIGS. 5A-5D illustrate an exemplary digital image at various stages of the method of FIG. 4.
Figure 5B:
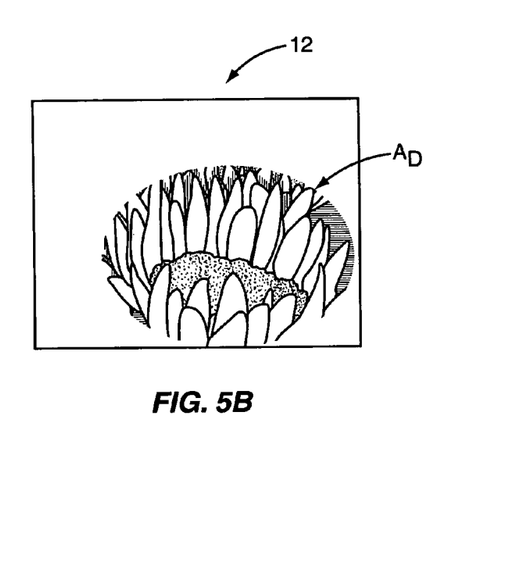
Figure 5C:
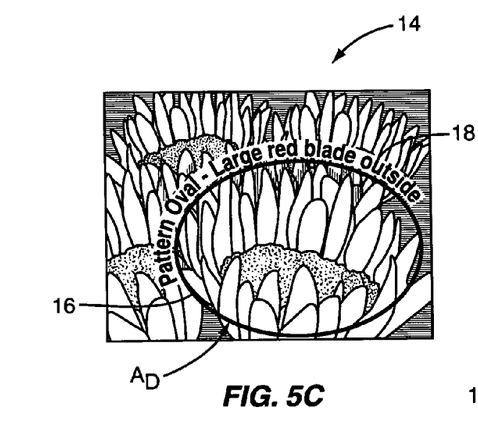
Figure 5D:
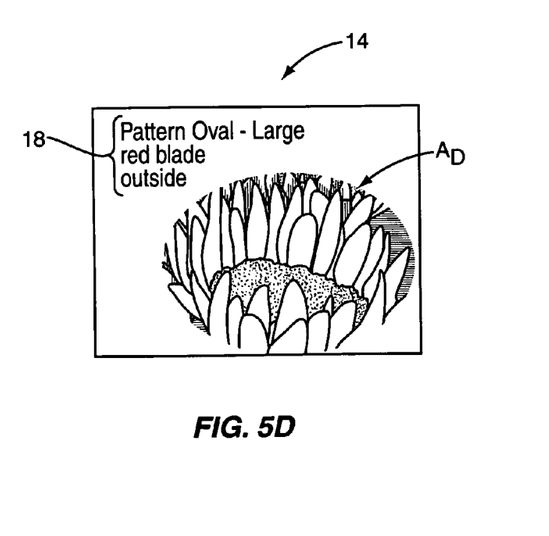

FIGS. 5A-5D illustrate an exemplary digital image at various stages of the process of FIG. 4. More specifically, FIG. 5A illustrates an exemplary digital image 12 at the beginning of the process. FIG. 5B illustrates the digital image 12 of FIG. 5A wherein a desired area ($A_D$) of the digital image 12 is identified according to step 204 of FIG. 4. FIG. 5C illustrates a first embodiment of a crop-assisted image 14 generated based on the cropping information stored for the desired area ($A_D$) identified in FIG. 5B. In this embodiment, the crop-assisted image 14 is essentially the digital image 12 of FIG. 5A having a line 16 identifying the desired area ($A_D$) identified in FIG. 5B. In addition, the crop tool needed to crop the crop-assisted image 14 is identified by crop tool identifier 18. FIG. 5D illustrates another exemplary embodiment of the crop-assisted image 14. In this embodiment, the crop-assisted image 14 includes only the desired area ($A_D$) of the digital image 12 identified in FIG. 5B, rather than the entire digital image 12. The crop-assisted image 14 also includes the crop tool identifier 18.

Figure 6:
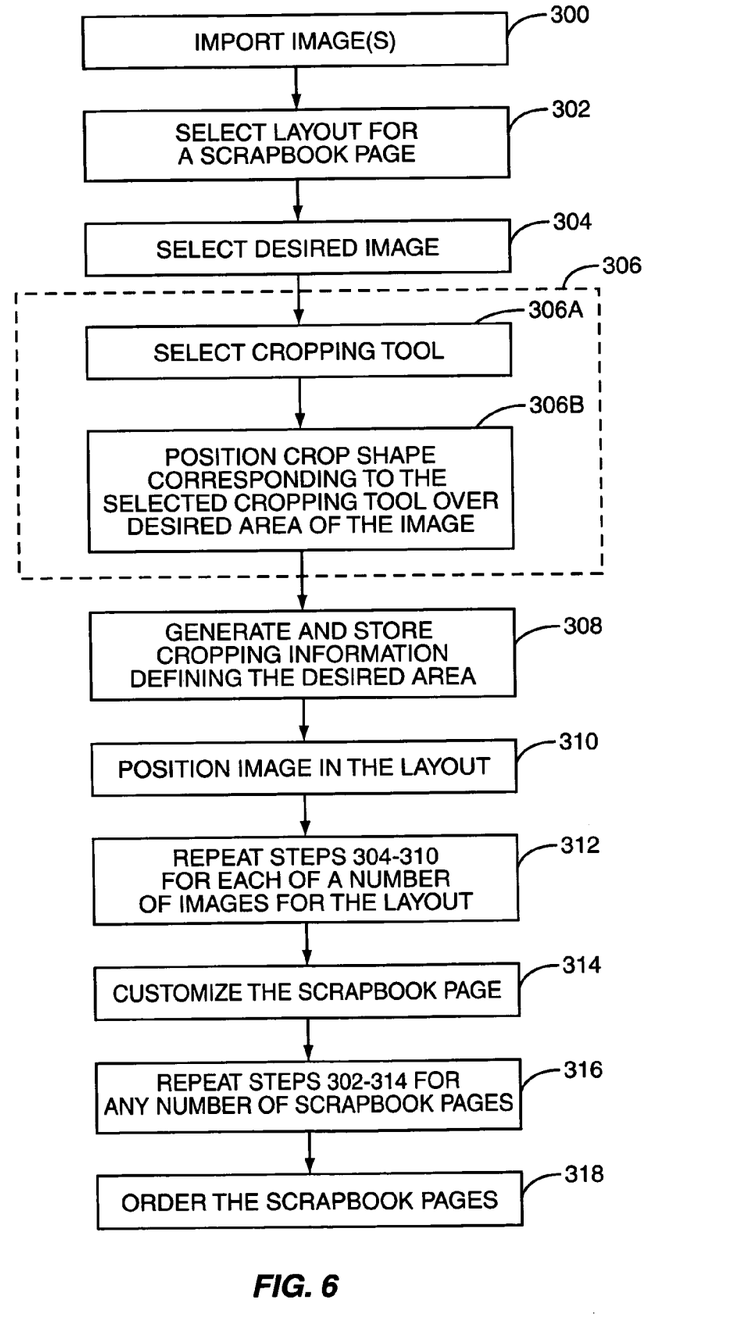
FIG. 6 illustrates an exemplary method for generating and ordering one or more scrapbook pages according to one embodiment of the present invention.

FIG. 6 illustrates an exemplary method of generating and ordering one or more scrapbook pages. In general, one or more digital images may first be imported into a software environment (step 300). Then, a desired layout for a scrapbook page is selected (step 302). The desired layout may be selected from a set of layouts provided by the software environment that is independent from any particular scrapbooking company or designed by the user. Alternatively, the layout may be selected from a set of layouts provided by a software package plug-in for a specific scrapbooking company, wherein the software package plug-in may provide information defining the set of layouts, the cropping tools, and other supplies that may be used for a scrapbook page. Prior to the customization described below, the layout may include one or more areas in which digital images are to be added, a title or a placeholder for a title, a date or a place holder for a date, a place holder for journaling, a default background, default paper color and texture, and the like. Alternatively, prior to customization, the layout may only include one or more areas in which digital images are to be added.

After selecting the layout, a desired digital image is selected for the scrapbook page (step 304). Once the digital image is selected, a desired area of the digital image is identified (step 306), and cropping information defining the desired area is generated and stored (step 308), as described above with respect to steps 204 and 206 of FIG. 4.

In general, the desired area of the digital image may be identified by selecting a cropping tool from a set of cropping tools to be used thereafter to physically crop the digital image when physically creating a scrapbook page (step 306A). After selecting the desired cropping tool, the user may then position a crop shape corresponding to the cropping tool over a desired area of the digital image (step 306B). Positioning the crop shape may include resizing the digital image and/or repositioning the crop shape or the digital image such that the desired area of the digital image is within the crop shape. Once the desired area is identified (step 306), cropping information defining the desired area of the digital image is generated and stored (step 308), and the digital image is positioned in the layout (step 310). It should be noted that the digital image may be positioned in the layout before the desired area is identified. Steps 304-310 may optionally be repeated for any number of digital images desired to be in the layout (step 312).

The scrapbook page may then be customized (step 314). The scrapbook page may be customized by, for example, adding various other elements such as stickers, letters, and die cuts; selecting paper color and texture for the scrapbook page; adding journaling; and/or adding paper shapes. For journaling, the desired text is entered by the user as a reminder of what to physically write on the scrapbook page when physically creating the scrapbook page. The paper shapes may be created using the same set of cropping tools to crop a sheet of paper. The paper may be any color and optionally have a desired texture. Thereafter, steps 302-314 may optionally be repeated for any number of scrapbook pages (step 316).

Next, the scrapbook pages designed in steps 302-316 may be ordered (step 318). Note that typical digital scrapbooking software may print scrapbook pages, where the printed scrapbook pages are the actual scrapbook pages for the scrapbook. In contrast, the present invention orders the scrapbook pages in such a manner as to allow the user to physically create the scrapbook pages easily and efficiently.

Ordering the scrapbook pages includes ordering the crop-assisted images from a photo printing service or printing the crop-assisted images using a local printer. When ordering the crop-assisted images from a photo printing service, the software environment may generate the crop-assisted images in a digital format based on the cropping information stored for the digital images and defining the desired areas identified in step 306, thereby generating temporary digital images. The temporary digital images are provided to the photo service provider, which prints the temporary digital images to provide printed copies of the crop-assisted images. The printed copies of the crop-assisted images may be provided either to the owner of the digital images or to a consultant for a scrapbooking company hosting an upcoming scrapbooking party.

Likewise, when printing the crop-assisted images at a local printer, the software environment may generate the crop-assisted images in a digital format based on the cropping information stored for the digital images and defining the desired areas identified in step 306, thereby generating temporary digital images. The temporary digital images are provided to the local printer, which provides printed copies of the crop-assisted digital images. The crop-assisted digital images may then be taken to the scrapbooking party and easily cropped using the identified cropping tools.

Ordering the scrapbook pages may also include generating a list of supplies and tools needed for the each scrapbook page. The list of supplies may include the cropping tools, paper, and various elements such as stickers, letters, and the like to be used on each scrapbook page. Optionally, the list of supplies and tools needed may be e-mailed to the consultant hosting the upcoming scrapbooking party such that the consultant can ensure that the necessary tools and supplies will be available.

Ordering the scrapbook pages may also include ordering a copy of a final layout of each scrapbook page. The copy of the final layout may be used to assist the user in assembling the scrapbook pages. The copy of the final layout may include the cropped images and various elements arranged on the scrapbook page. Alternatively, the copy of the final layout may include space holders such as shapes with labels for each of the cropped images and elements on the scrapbook page.

In addition, ordering the scrapbook pages may include providing any text added to the layouts for journaling to either the user or the consultant. The text may be used when physically writing text on the scrapbook pages as a reminder of the desired journaling. Ordering the scrapbook pages may also include ordering crop-assisted paper. The crop-assisted paper may be similar to the crop-assisted images describe above, wherein a line may be used to identify a desired shape to be created using the paper and the crop tool needed to create the paper shape. In addition, the crop-assisted paper may optionally include a page number and a picture name or description associated with each paper shape. The crop-assisted paper may include numerous shapes on a single sheet of paper. The crop-assisted paper may be delivered to the user or to the consultant of the scrapbooking company. Alternatively, the crop-assisted paper may be printed on a local printer. As another alternative, the information defining the crop-assisted paper may be provided to the consultant, and the consultant may print the crop assisted paper. This may especially be beneficial when the consultant has paper having the desired color and texture.

Ordering the scrapbook pages may also include ordering one or more copies of the original digital images or one or more standard crop sizes of the digital images. This may be beneficial because the user may desire additional cropped versions of the digital images once he or she is at the scrapbooking party or may change his or her mind about the crop shape to be used.

Figure 7:
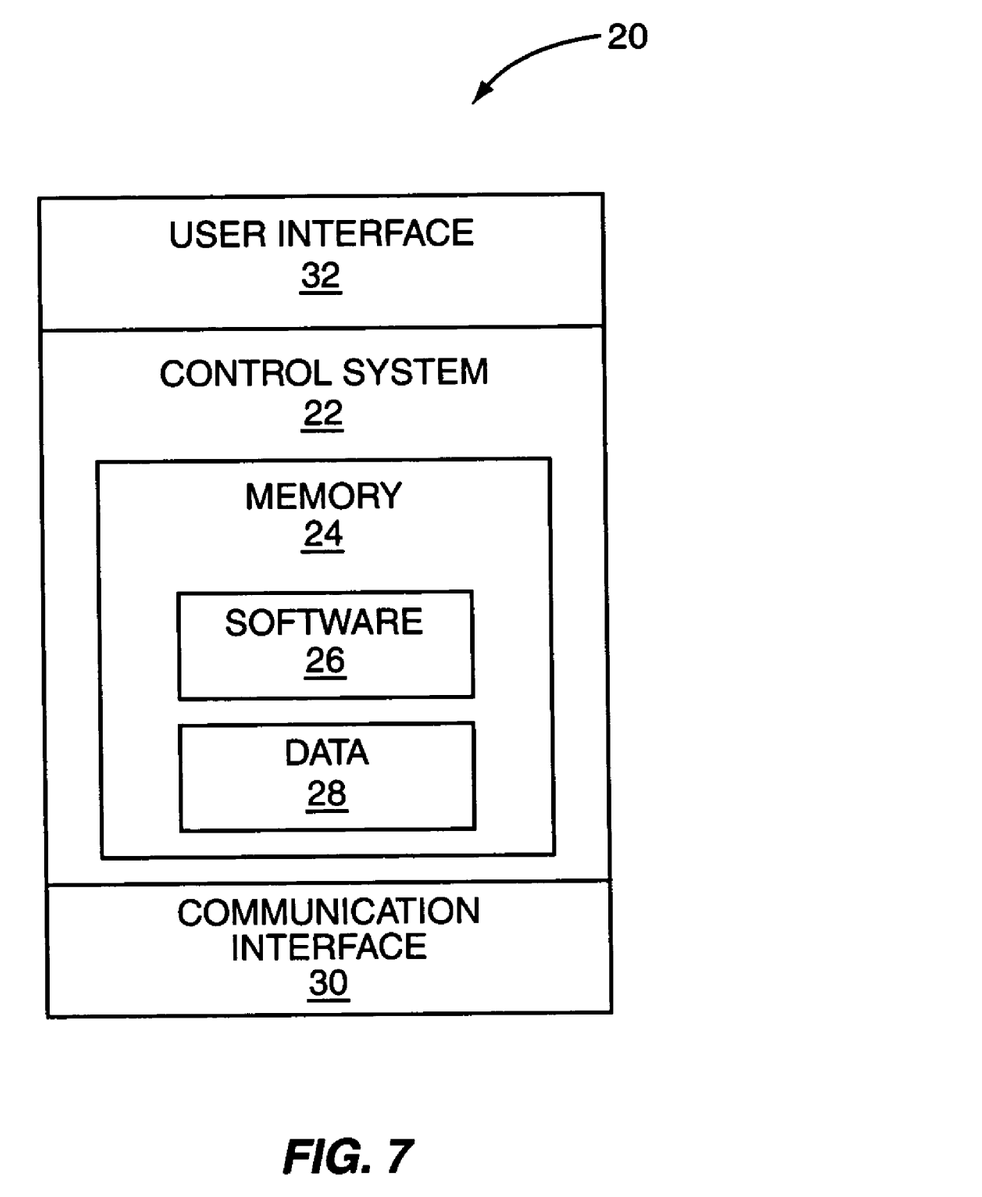
FIG. 7 illustrates an exemplary system running software that instructs the system to operate according to the present invention.

The present invention may be incorporated into software residing on a system 20 such as that illustrated in FIG. 7. The system 20 may be a central server, a user's computer, a node in a peer-to-peer network, a photo printing kiosk, or the like. The system 20 will generally include a control system 22 having associated memory 24. The memory 24 may store software 26, such as photoediting software, that generates and stores cropping information for any number of desired areas of a digital image and optionally layouts of scrapbooking pages according to the present invention. The memory 24 may also store data 28, such as a digital image file comprising a digital image, or a compressed version thereof, and metadata and/or an application file associated with the software 26. The system 20 may also include a communication interface 30 for communicating with network entities. The communication interface 30 may also include an interface to various external devices such as a printer. A user interface 32 may also be provided and include a display, keypad, and a mouse (not shown).

Although FIG. 7 illustrates the software 26 within the memory 24 of the system 20, the software 26 may be stored on any computer readable medium such as, but not limited to, a storage device of a central server, a storage device of a user's computer, an optical disk such as a compact disc (CD) or a Digital Video Disc (DVD), or the like. In addition, the software 26 may reside on a central server and be downloaded to and installed on a computer for any number of users.

Those skilled in the art will recognize improvements and modifications to the preferred embodiments of the present invention. All such improvements and modifications are considered within the scope of the concepts disclosed herein and the claims that follow.

What is claimed is:

1. A method of operation of a computer programmed to perform photo editing operations, comprising:

identifying, by the computer programmed to perform photo editing operations, a desired area of a digital image, the desired area having a shape corresponding to a shape of a select physical cropping tool;

generating, at the computer, cropping information defining the desired area;

storing the cropping information in association with the digital image; and generating a crop-assisted version of the digital image based on the cropping information, the crop-assisted version of the digital image identifying the desired area of the digital image and the select physical cropping tool;

wherein identifying the desired area of the digital image comprises:

selecting the select physical cropping tool from a set of physical cropping tools; and positioning a crop shape corresponding to the shape of the select physical cropping tool over the desired area of the digital image.

2. The method of claim 1 wherein generating the crop-assisted version of the digital image comprises generating the crop-assisted version of the digital image as a temporary digital image.

3. The method of claim 1 further comprising providing the crop-assisted version of the digital image to either a local printer or a photo printing service provider to provide a printed copy of the crop-assisted version of the digital image.

4. The method of claim 3 wherein the printed copy of the crop-assisted version of the digital image is cropped using the select physical cropping tool.

5. The method of claim 1 wherein the set of physical cropping tools is associated with a particular scrapbooking company.

6. The method of claim 1 further comprising:

selecting a layout for a scrapbook page; and positioning the digital image in the layout such that the desired area of the digital image is positioned in a desired area of the scrapbook page.

7. The method of claim 6 wherein positioning the digital image in the layout occurs before identifying the desired area of the digital image.

8. The method of claim 6 wherein positioning the digital image in the layout occurs after identifying the desired area of the digital image.

9. The method of claim 6 further comprising customizing the scrapbook page using at least one element selected from a group consisting of: stickers, paper shapes, journaling, and letters.

10. The method of claim 9 further comprising generating a list of supplies including the select physical cropping tool and the at least one element needed for the layout.

11. The method of claim 10 further comprising providing the list of supplies to a consultant associated with a scrapbooking company.

12. The method of claim 6 further comprising providing a printed version of the scrapbook page to an owner of the scrapbook page, wherein the printed version of the scrapbook page assists the owner in physically creating the scrapbook page.

13. A computer readable medium storing software adapted to instruct a system to:

identify a desired area of a digital image, the desired area having a shape corresponding to a shape of a select physical cropping tool;

generate cropping information defining the desired area;

store the cropping information in association with the digital image; and generate a crop-assisted version of the digital image based on the cropping information, wherein the crop-assisted version of the digital image identifies the desired area of the digital image and the select physical cropping tool;

wherein, in order to identify the desired area of the digital image the software is further adapted to instruct the system to:

select the select physical cropping tool from a set of physical cropping tools; and position a crop shape corresponding to the shape of the select physical cropping tool over the desired area of the digital image.

14. The computer readable medium of claim 13 wherein the software is further adapted to instruct the system to generate the crop-assisted version of the digital image as a temporary digital image.

15. The computer readable medium of claim 13 wherein the software is further adapted to instruct the system to provide the crop-assisted version of the digital image to either a local printer or a photo printing service provider to provide a printed copy of the crop-assisted version of the digital image.

16. The computer readable medium of claim 15 wherein the printed copy of the crop-assisted version of the digital image is cropped using the select physical cropping tool.

17. The computer readable medium of claim 13 wherein the set of physical cropping tools is associated with a particular scrapbooking company.

18. The computer readable medium of claim 13 wherein the software is further adapted to instruct the system to:

select a layout for a scrapbook page; and position the digital image in the layout such that the desired area of the digital image is positioned in a desired area of the scrapbook page.

19. The computer readable medium of claim 18 wherein the software is further adapted to instruct the system to customize the scrapbook page using at least one element selected from a group consisting of: stickers, paper shapes, journaling, and letters.

20. The computer readable medium of claim 19 wherein the software is further adapted to instruct the system to generate a list of supplies including the select physical cropping tool and the at least one element needed for the layout.

21. The computer readable medium of claim 20 wherein the software is further adapted to instruct the system to provide the list of supplies to a consultant associated with a scrapbooking company.

22. The computer readable medium of claim 18 wherein the software is further adapted to instruct the system to provide a printed version of the scrapbook page to an owner of the scrapbook page, wherein the printed version of the scrapbook page assists the owner in physically creating the scrapbook page.

* * * * *